Sept. 5, 1961 W. LEE ROY HENDERSON 2,998,951
ADJUSTABLE BUS DUCT SUPPORT
Filed Dec. 23, 1959

INVENTOR.
WAYNE LEE ROY HENDERSON
BY
William D. Roberson
ATTORNEY though the sides of the sheet 2,998,951
ADJUSTABLE BUS DUCT SUPPORT
Wayne Lee Roy Henderson, West Hartford, Conn., assignor to General Electric Company, a corporation of New York
Filed Dec. 23, 1959, Ser. No. 861,532
4 Claims. (Cl. 248—70)

This invention relates to enclosed bus bar duct systems of electrical power distribution and more particularly to improved adjustable support arrangements for such systems.

Bus ducts are generally fabricated in long sections which are assembled at the location of their use, individual sections being joined together in end-to-end relationship at the final location. Because of their size and weight these sections are unwieldy. Among the problems encountered in their assembly are not only to join the ends of adjacent sections of bus ducts and the enclosed bus bars but simultaneously to support the individual sections while the end connections are being made. Support arrangements have generally been of a type which require loosening of the grip on the busway to adjust the position of the duct. Particularly in long vertical runs this complicates the job of joining bus sections because of the difficulty of maneuvering the entire weight of each bus section to position it for connection to the next preceding section.

It is an object of this invention to provide improved bus duct support arrangements which facilitate assembly of the busway system by permitting locational adjustments of the busway sections while maintaining a firm support of the busway.

It is a further object of this invention to provide adjustable bus bar duct supports having improved construction features which contribute greatly to the simplicity of fabrication and the ease of installation.

By way of a brief summary of a preferred embodiment of the invention I provide a vise-like clamp having adjustable jaws dimensioned to grip a keyway or other support surface on a busway and to fasten upon it in a direction transverse to the longitudinal dimension of the busway. The clamp is carried upon a threaded member which passes through the clamp in a direction parallel to the long dimension of the busway, the threaded member being fixed in turn to a mounting bracket formed to provide a recess in which the clamp is adjustably positioned. With the mounting bracket attached, for example, to a vertical wall, and the clamp firmly fastened upon a busway section running vertically up the wall, the position of the busway may be adjusted up and down the wall without danger of slipping by rotating the threaded member to thereby vary the relative positions of the clamp and bracket.

Figure 1:
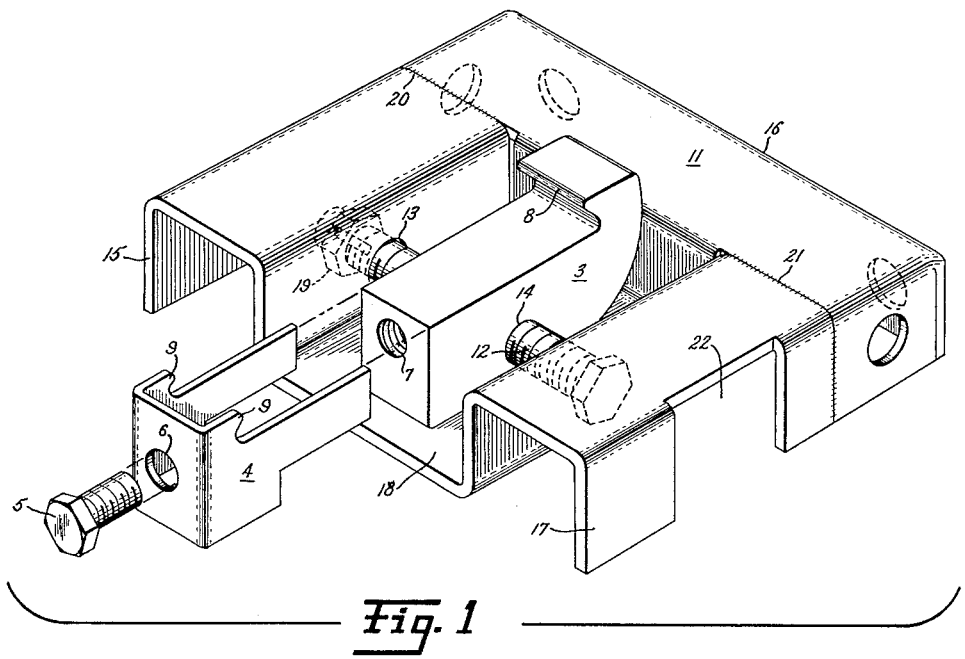
Figure 2:
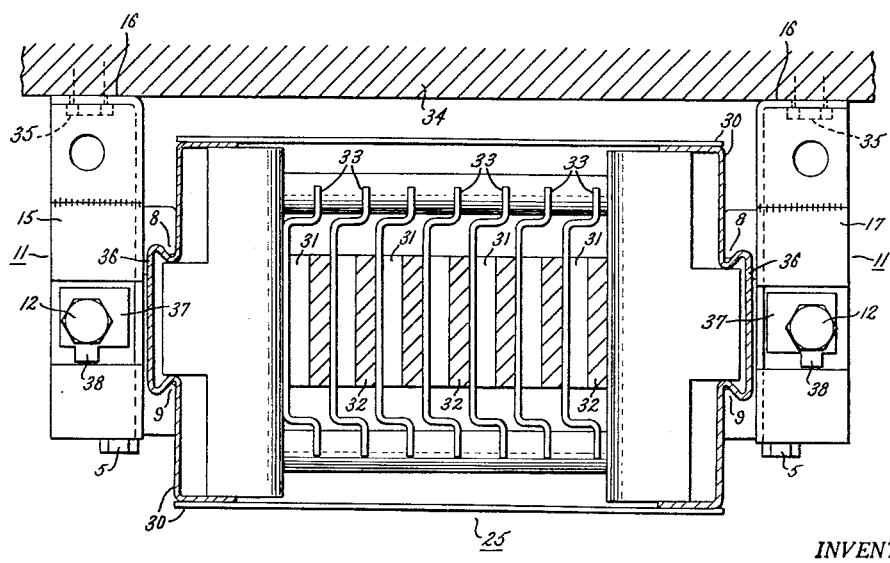

Further details of the invention as well as additional objects and advantages will be better understood with reference to the following more complete description taken together with the accompanying drawings wherein:

FIG. 1 is a perspective view partly disassembled of an adjustable busway support arrangement constructed according to this invention; and FIG. 2 is a plan view of a pair of busway support arrangements of the type shown in FIG. 1 and illustrating their attachment to a busway section.

As best seen in FIG. 1 the support structure shown includes a clamp comprising a pair of clamping members 3 and 4. The clamping members are drawn together in a vise-like assembly by a machine screw 5 which passes through an opening 6 in the clamping member 4 and is received in the internally threaded opening 7 in the clamping member 3. Clamping member 3 is preferably of a block-like nature being of cast metal or the like while clamping member 4 is preferably constructed of sheet metal bent generally in the shape of a U to embrace and be guided by the sides of clamping member 3. Tightening the screw 5 thus draws together the clamping members such that their opposed jaws 8 and 9 respectively may grip another member inserted between them.

The clamp assembly consisting of clamping members 3 and 4 and screw 5 are adjustably positioned within a recessed supporting bracket 11 by another threaded member, machine bolt 12. This latter bolt passes loosely through apertures 13, only one of which is visible in the drawing, in supporting bracket 11, and is received within a cooperating internally threaded opening 14 in the clamping member 3. Rotation of adjusting bolt 12 by a wrench or otherwise varies the relative positions of the bracket 11 and the clamp assembly by displacing the clamp assembly along the length of the bolt 12 transversely to the direction of clamping action exerted by members 3 and 4. And, it may be added, this transverse positional adjustment of the clamp is totally independent of the clamping action asserted by the clamp assembly on a member inserted between jaws 8 and 9. The clamping member 3 is prevented from rotating about the bolt 12 by flatwise engagement of its longitudinal bottom face as seen in FIG. 3, with the bottom wall of the recess in the supporting bracket 11.

Certain construction features of the structure shown in FIG. 1 which contribute to its strength, its convenience, and the ease of its fabrication should be noted. The supporting bracket 11, although of a rigid box-like construction with bracing surfaces on three sides 15, 16 and 17, is formed of a single sheet of metal, preferably steel, bent up on three sides to form an internal recess 18 within which the clamp assembly is supported and guided. At the top of the recess these three sides turn outward and then backward to form the three sides 15, 16 and 17. To lend greater rigidity to the bracket two seams 20 and 21 are welded. Convenient access to the head of bolt 12 and to its cooperating nut 19 is provided by cutaway openings in two of the bearing surfaces 15 and 17, one of which is shown at 22. The nut 19 is preferably locked or wired to the end of screw 12. Only two tapped holes 7 and 14 are required in the preferred construction shown and both of these are located in the same member 3. These holes are preferably tapped with the same diameter and thread pitch to simplify the manufacturing steps.

In FIG. 2 is shown in end view a portion of a feeder busway system 25. Such a busway system which may be of the type shown in U.S. Patent 2,906,811, issued September 29, 1959, to L. E. Fisher, may include a number of standard lengths or sections of busway which have an elongated housing 30 enclosing a plurality of side by side bus bars 31 supported in spaced apart insulated relationship therein. At the ends of each section it is, of course, necessary to join each of the bus bars to the bus bars contained in the next adjacent portion of the distribution system. To illustrate this I have shown the cross-hatched overlapping ends of the next adjacent bus bars 32, the different phases of the bus bars being separated from each other by insulating spacers 33. The means for clamping the ends of the bus bars to each other are not shown in the drawing but may be of the type shown in the aforesaid patent. Since the internal structure of the busway and its bus bars is not the subject of this invention, it should be sufficient to point out that in assembling the distribution system it is important to join the ends of two busway sections in a proper and precise relationship and that this may require jockeying one section longitudinally with respect to the other. If the particular length of busway rises vertically, the difficulty of adjusting the positions of these long heavy sections is most apparent. The supporting surface 34 may be considered a vertically extending wall with the length of busway section running up it.

To install the busway section brackets 11 are first secured in position on the wall, being affixed thereto by bolts 35 passing through their mounting surfaces 16. Thereafter busway section 25 is installed with its keyways 36 inserted within the jaws 8 and 9 of the clamping assembly. When the busway section is in a position approximating its final desired position, the screws 5 are tightened to clamp the busway sections securely and to prevent it from slipping. Thereafter the vertical location of the busway section is adjusted accurately up or down to its desired final position by turning the adjusting bolt 12 in one direction or the other, this adjustment being made without loosening the firm supporting grip maintained on the busway housing. When the busway section is at its final position it may be permanently secured through the use of non-rotatable rectangular washers 37 whose tabs 38 are bent up to engage a flat side of the heads of machine screws 12 and prevent their rotation.

While I have shown and described only one preferred embodiment of this invention it will be understood that this has been illustrative in nature and that certain modifications of the invention will doubtless occur to those skilled in the art to which it pertains. I therefore wish to cover by the following claims all such modifications as fall within the true spirit and scope of this invention.

What I claim as new and desire to secure by Letters Patent of the United States is:

1. A bus bar duct support comprising: a supporting bracket having a recess therein and including means for attaching said bracket to a mounting surface; a threaded member spanning said recess and supported for rotation on said bracket; and a jaw clamp adapted to grip the external surface of a bus duct and including a pair of opposed clamping members mounted within said recess upon said threaded member for adjustable movement therealong, rotation of said threaded member adjustably positioning said clamping members within said recess in a direction transverse of their direction of clamping action.

2. In combination: a first clamping member of a block-like construction having a first clamping jaw and a pair of internally threaded apertures extending in directions at right angles to each other; a second clamping member embracing said first clamping member and having a clamping jaw opposing said first clamping jaw; a first screw member cooperating with one of said threaded apertures and engaging said second clamping member for drawing said jaws toward each other thereby to clamp upon an article inserted therebetween; a second screw member cooperating with the other of said threaded apertures; and a supporting bracket journaling said second screw member for rotation and having means for attaching said bracket to a mounting surface, rotation of said second threaded member causing a relative displacement of said first and second clamping members with respect to said supporting bracket.

3. In combination: a bracket including a U-shaped portion having a bottom wall and sidewalls forming therebetween a recess; an adjusting bolt loosely journaled in said sidewalls and spanning said recess; a first clamping member of block-like construction adjustably positioned in said recess and threadably engaging said adjusting bolt for movement therealong in response to rotation of said threaded member, said first clamping member having a threaded opening therein extending in a direction at right angles to said adjusting bolt and having a clamping jaw generally parallel to said adjusting bolt; a second clamping member having a clamping jaw guided for reciprocating movement toward and away from the clamping jaw of said first clamping member; and screw means cooperating with the threaded opening in said first clamping member and engaging said second clamping member for drawing said clamping jaws together in a direction transverse of said adjusting bolt.

4. In combination with a bus duct, means for adjustably supporting said bus duct adjacent a mounting surface comprising: a first clamping member of a block-like construction having a pair of internally threaded openings therein extending in directions at right angles of each other; a second cooperating clamping member having a pair of generally parallel extensions embracing said first clamping member and guided thereby for reciprocating movement toward and away from said first clamping member, said clamping members having respectively opposed clamping jaws; a first screw member cooperating with one of said threaded apertures in said first clamping member and engaging said second clamping member to draw said jaws into firm clamping engagement with said bus duct; a supporting bracket having means for fixed attachment to said mounting surface and including a U-shaped portion having a bottom wall and sidewalls forming therebetween a recess; a second screw member rotatably journaled in the side walls of said bracket to span said recess and adjustably threadedly engaging the other of said internally threaded openings in said first clamping member, whereby rotation of said second screw member effects a relative lateral displacement of said clamping members in said recess and with respect to said bracket without loosening the grip of said clamping jaws on a bus duct clamped therebetween.

References Cited in the file of this patent

UNITED STATES PATENTS

| | | |
|---|---|---|
| 2,246,557 | Walters | June 24, 1941 |
| 2,840,630 | Born et al. | June 24, 1958 |